(12) United States Patent
Sun et al.

(10) Patent No.: US 12,162,474 B2
(45) Date of Patent: Dec. 10, 2024

(54) DATA PROCESSING METHOD AND APPARATUS

(71) Applicant: HUAWEI TECHNOLOGIES CO., LTD., Guangdong (CN)

(72) Inventors: Xutong Sun, Shenzhen (CN); Junchao Li, Shanghai (CN); Shengbo Gong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 251 days.

(21) Appl. No.: 17/960,494

(22) Filed: Oct. 5, 2022

(65) Prior Publication Data
US 2023/0049561 A1  Feb. 16, 2023

Related U.S. Application Data

(63) Continuation of application No. PCT/CN2021/078430, filed on Mar. 1, 2021.

(30) Foreign Application Priority Data

Apr. 8, 2020  (CN) .......................... 202010269727.5

(51) Int. Cl.
*B60W 30/06* (2006.01)
*G06V 20/58* (2022.01)

(52) U.S. Cl.
CPC ............ *B60W 30/06* (2013.01); *G06V 20/58* (2022.01); *G06V 20/586* (2022.01);
(Continued)

(58) Field of Classification Search
CPC ........... B60W 30/06; B60W 2420/403; B60W 2420/408; B60W 2520/28; B60W 2555/20; G06V 20/58; G06V 20/586
(Continued)

(56) References Cited

U.S. PATENT DOCUMENTS

| | | | |
|---|---|---|---|
| 2008/0136673 A1 | 6/2008 | Jung | |
| 2009/0207045 A1 | 8/2009 | Jung | |

(Continued)

FOREIGN PATENT DOCUMENTS

| | | | |
|---|---|---|---|
| CN | 106846870 A | 6/2017 | |
| CN | 107491738 A | 12/2017 | |

(Continued)

OTHER PUBLICATIONS

Li et al., "Vision-Based Parking-Slot Detection: a Benchmark and a Learning-Based Approach," Proceedings of the IEEE International Conference on Multimedia and Expo (ICME) 2017, Jul. 10-14, 2017, 6 pages.

(Continued)

*Primary Examiner* — Isaac G Smith
(74) *Attorney, Agent, or Firm* — Fish & Richardson P.C.

(57) ABSTRACT

Example data processing methods and apparatus are provided. One example method includes obtaining an image captured by an in-vehicle camera. A to-be-detected target in the image is determined. A feature region corresponding to the to-be-detected target in the image is further determined based on a location of the to-be-detected target in the image. A first parking state is determined based on the image and wheel speedometer information. A first homography matrix corresponding to the first parking state is determined from a prestored homography matrix set, where different parking states correspond to different homography matrices. Image information of the feature region is processed based on the first homography matrix to obtain a detection result.

21 Claims, 9 Drawing Sheets

(52) U.S. Cl.
CPC . *B60W 2420/403* (2013.01); *B60W 2420/408* (2024.01); *B60W 2520/28* (2013.01); *B60W 2555/20* (2020.02)

(58) Field of Classification Search
USPC .......................................................... 701/26
See application file for complete search history.

(56) References Cited

U.S. PATENT DOCUMENTS

2016/0217558 A1* 7/2016 Lee ..................... G06V 20/58
2019/0370572 A1* 12/2019 Nagpal .................. G06T 7/62

FOREIGN PATENT DOCUMENTS

| | | |
|---|---|---|
| CN | 107856667 A | 3/2018 |
| CN | 109278742 A | 1/2019 |
| CN | 109446909 A | 3/2019 |
| CN | 109697860 A | 4/2019 |
| CN | 110415550 A | 11/2019 |
| CN | 110689761 A | 1/2020 |
| CN | 110696822 A | 1/2020 |
| CN | 110705359 A | 1/2020 |
| WO | 2019233286 A1 | 12/2019 |

OTHER PUBLICATIONS

Office Action in Chinese Appln. No. 202010269727.5, dated Jun. 1, 2022, 7 pages (with English translation).
International Search Report and Written Opinion in International Appln. No. PCT/CN2021/078430, mailed on May 27, 2021, 14 pages (with English translation).
Extended European Search Report in European Appln No. 21785001.5, dated Jul. 20, 2023, 7 pages.

* cited by examiner

| Left front | Front | Right front |
|---|---|---|
| Left | Vehicle body | Right |
| Left rear | Rear | Right rear |

(a)          (b)

DATA PROCESSING METHOD AND APPARATUS

CROSS-REFERENCE TO RELATED APPLICATIONS

This application is a continuation of International Application No. PCT/CN2021/078430, filed on Mar. 1, 2021, which claims priority to Chinese Patent Application No. 202010269727.5, filed on Apr. 8, 2020. The disclosures of the aforementioned applications are hereby incorporated by reference in their entireties.

TECHNICAL FIELD

This application relates to the self-driving field, and more specifically, to a data processing method in an automatic parking process.

BACKGROUND

With progress of science and technology and development of artificial intelligence, people have increasingly high expectations for an intelligent connectivity level of vehicle driving and intelligent assisted driving of a vehicle. Therefore, various intelligent assisted driving functions of the vehicle emerge, for example, an in-vehicle surround-view system.

A working principle of the in-vehicle surround-view system is: separately performing photographing by using a plurality of cameras (for example, fisheye cameras) installed at different locations of a vehicle body, to obtain a plurality of images of different orientation angles of view of the vehicle; then, performing bird's-eye-view transformation on these images by using a homography matrix, and performing panoramic stitching on images obtained after the bird's eye view transformation to obtain an in-vehicle surround view; and next, detecting a parking space, an obstacle, and the like in the in-vehicle surround view by using a neural network, and performing parking based on a detection result.

In an automatic parking scenario, parking precision has a very high requirement for precision of an image captured by a camera. Different states of a parking process have different sensing precision requirements for regions at different locations away from the vehicle body. However, currently, for any region in the in-vehicle surround view, precision of regions with different distances from the vehicle body is different. Detection precision of a region corresponding to a determined parking state may not meet a precision requirement of the parking state for the region. Consequently, a parking success rate is reduced, and even a traffic accident occurs.

SUMMARY

This application provides a data processing method and apparatus, applied to the self-driving field, to improve a parking success rate and further reduce an occurrence rate of a traffic accident.

According to a first aspect, a data processing method is provided. The method may be applied to an automatic parking scenario. The method may be performed by an automatic parking apparatus (system), a driver assistant apparatus, or a driver assistant system integrated into a mobile device (for example, a vehicle), or may be performed by a chip or an integrated circuit in the mobile device. For example, the chip may be a chip in an in-vehicle processor. The mobile device may include a device, such as a vehicle or an airplane, whose spatial location may be moved by using a human operation. The method includes: obtaining an image captured by an in-vehicle camera; determining a to-be-detected target; determining a feature region corresponding to the to-be-detected target in the image based on a location of the to-be-detected target in the image; determining a first parking state based on the image and wheel speedometer information; determining a first homography matrix corresponding to the first parking state from a prestored homography matrix set, where different parking states correspond to different homography matrices; and processing image information of the feature region based on the first homography matrix, to obtain a detection result.

According to the data processing method provided in the first aspect, a plurality of homography matrices are preconfigured or predefined based on different precision requirements during parking, and different homography matrices correspond to different parking states. After a parking state is determined, image information of a feature region that corresponds to the parking state and that is of a to-be-detected target in an image is processed by using a specific homography matrix corresponding to the parking state, to obtain a detection result. Better parameter constraint may be performed on the feature region in which the to-be-detected target is located in the image, to improve detection precision and location precision of the feature region, thereby improving a parking success rate.

Optionally, the to-be-detected target includes a parking space, an obstacle, and the like.

Optionally, after the feature region corresponding to the parking state is determined, because there is no detection requirement for another region in an in-vehicle surround view, resolution of an image of the another region may be reduced or an image of the another region is directly not output, and computing power overheads of an in-vehicle chip are used for parameter configuration of the homography matrix of the feature region and image generation.

Optionally, after the in-vehicle surround view is obtained, information such as a location of the to-be-detected target in the in-vehicle surround view may be determined based on a neural network.

Optionally, the first parking state may be determined based on the in-vehicle surround view (image), the wheel speedometer information, vehicle posture information, vehicle planning control information, and the like.

Optionally, a correspondence between the homography matrix set, the homography matrix, and the parking state may be preconfigured or predefined.

Optionally, different feature regions may be determined based on different distances from the to-be-detected target to a vehicle body.

Optionally, a preconfigured (or default) homography matrix may be used to perform bird's-eye-view transformation on the image captured by the in-vehicle camera, to obtain a bird's eye view corresponding to the image of the camera, and then image stitching is performed on bird's eye views of four cameras by using a corresponding image relationship between overlapping regions of the four bird's eye views according to an image fusion and stitching algorithm, to obtain an in-vehicle surround view.

In a possible implementation of the first aspect, the method further includes: determining a first transmit/receive state parameter corresponding to the first parking state from a prestored set of transmit/receive state parameters of a plurality of ultrasonic radars, where the first transmit/receive state parameter is any one of single-transmit multi-receive, single-transmit single-receive, or multi-transmit multi-receive. In this implementation, the set of the transmit/receive state parameters of the plurality of ultrasonic radars are preconfigured or predefined based on different precision requirements during parking, and corresponding transmit/receive state parameters of the plurality of ultrasonic radars are determined based on different parking states. Data obtained by the plurality of ultrasonic radars is obtained by using the transmit/receive state parameters of the plurality of ultrasonic radars for parking, so that parking precision and a parking success rate can be improved.

Single-transmit multi-receive may be understood as follows: At a same time, one ultrasonic radar performs sending and receiving, and a plurality of other ultrasonic radars perform receiving. Single-transmit single-receive may be understood as follows: At a same time, one ultrasonic radar performs sending and receiving. Multi-transmit multi-receive may be understood as follows: At a same time, a plurality of ultrasonic radars perform sending and receiving.

Optionally, the plurality of ultrasonic radars may be four UPA radars at the rear of the vehicle body.

In a possible implementation of the first aspect, the first parking state is a parking space searching state or a vehicle parking state.

Optionally, the first parking state may alternatively be another parking state, for example, a far-end parking space searching state or a near-end parking space searching state.

In a possible implementation of the first aspect, when the first parking state is the parking space searching state, the first homography matrix is a far-end homography matrix, and the feature region corresponding to the to-be-detected target in the image is a first feature region; or when the first parking state is the vehicle parking state, the first homography matrix is a near-end homography matrix, and the feature region corresponding to the to-be-detected target in the image is a second feature region, where a distance from a to-be-detected target in the first feature region to a vehicle body is greater than a distance from a to-be-detected target in the second feature region to the vehicle body. In this implementation, dynamic homography matrix configuration is performed based on different parking states, and a homography matrix is enabled for image processing based on different parking states during parking. In addition, resolution of an image of another region can be reduced or an image of another region is directly not output, to reduce computing power overheads and energy consumption of an in-vehicle chip, and improve computing efficiency.

In a possible implementation of the first aspect, when the first parking state is the parking space searching state, the first transmit/receive state parameter is single-transmit single-receive; or when the first parking state is the vehicle parking state, the first transmit/receive state parameter is single-transmit multi-receive or multi-transmit multi-receive. In this implementation, computing power overheads can be reduced when a parking requirement is met.

In a possible implementation of the first aspect, the method further includes: adjusting a size of the feature region based on different parking environments. In this implementation, higher detection precision and higher location precision can be achieved, and parking precision can be further improved.

In a possible implementation of the first aspect, the parking environment includes at least one of a weather condition during parking, a ground condition during parking, or an ambient environment of a vehicle during parking.

In a possible implementation of the first aspect, the to-be-detected target includes at least one of a parking space or an obstacle.

According to a second aspect, a data processing method is provided. The method may be applied to an automatic parking scenario. The method may be performed by an automatic parking apparatus (system), a driver assistant apparatus, or a driver assistant system integrated into a mobile device (for example, a vehicle), or may be performed by a chip or an integrated circuit in the mobile device. For example, the chip may be a chip in an in-vehicle processor. The mobile device may include a device, such as a vehicle or an airplane, whose spatial location may be moved by using a human operation. The method includes: obtaining an image captured by an in-vehicle camera; determining a first parking state based on the image and wheel speedometer information; determining a first transmit/receive state parameter corresponding to the first parking state from a prestored set of transmit/receive state parameters of a plurality of ultrasonic radars, where the first transmit/receive state parameter is any one of single-transmit multi-receive, single-transmit single-receive, or multi-transmit multi-receive; and obtaining, by using the first transmit/receive state parameter, data obtained by the plurality of ultrasonic radars for parking.

According to the data processing method provided in the second aspect, the set of the transmit/receive state parameters of the plurality of ultrasonic radars are preconfigured or predefined based on different precision requirements during parking, and corresponding transmit/receive state parameters of the plurality of ultrasonic radars are determined based on different parking states. The data obtained by the plurality of ultrasonic radars is obtained by using the transmit/receive state parameters of the plurality of ultrasonic radars for parking, so that parking precision and a parking success rate can be improved.

Optionally, a correspondence between the set of the transmit/receive state parameters of the plurality of ultrasonic radars, each of the transmit/receive state parameters of the plurality of ultrasonic radars, and the parking state may be preconfigured or predefined.

In a possible implementation of the second aspect, when the first parking state is a parking space searching state or another parking state than a vehicle parking state, the transmit/receive state parameters of the plurality of ultrasonic radars are single-transmit single-receive; or when the first parking state is a vehicle parking state, the transmit/receive state parameters of the plurality of ultrasonic radars are single-transmit multi-receive or multi-transmit multi-receive.

In a possible implementation of the second aspect, the method may further include: determining a to-be-detected target; determining a feature region corresponding to the to-be-detected target in the image based on a location of the to-be-detected target in the image; determining a first homography matrix corresponding to the first parking state from a prestored homography matrix set, where different parking states correspond to different homography matrices; and processing image information of the feature region based on the first homography matrix, to obtain a detection result.

Optionally, different feature regions may be determined based on different distances from the to-be-detected target to a vehicle body.

In a possible implementation of the second aspect, when the first parking state is the parking space searching state, the first homography matrix is a far-end homography matrix, and the feature region corresponding to the to-be-detected target in the image is a first feature region; or when the first parking state is the vehicle parking state, the first homography matrix is a near-end homography matrix, and the feature region corresponding to the to-be-detected target in the image is a second feature region, where a distance from a to-be-detected target in the first feature region to a vehicle body is greater than a distance from a to-be-detected target in the second feature region to the vehicle body.

Optionally, different feature regions may be determined based on different distances from the to-be-detected target to a vehicle body.

In a possible implementation of the second aspect, the method further includes: adjusting a size of the feature region based on different parking environments.

In a possible implementation of the second aspect, the parking environment includes at least one of a weather condition during parking, a ground condition during parking, or an ambient environment of a vehicle during parking.

Optionally, the to-be-detected target includes a parking space, an obstacle, and the like.

Optionally, after the feature region corresponding to the parking state is determined, because there is no detection requirement for another region in an in-vehicle surround view, resolution of an image of the another region may be reduced or an image of the another region is directly not output, and computing power overheads of an in-vehicle chip are used for parameter configuration of the homography matrix of the feature region and image generation.

Optionally, after the in-vehicle surround view is obtained, information such as a location of the to-be-detected target in the in-vehicle surround view may be determined based on a neural network.

Optionally, the first parking state may be determined based on the in-vehicle surround view (image), the wheel speedometer information, vehicle posture information, vehicle planning control information, and the like.

Optionally, a correspondence between the homography matrix set, the homography matrix, and the parking state may be preconfigured or predefined.

According to a third aspect, a data processing apparatus is provided. The apparatus includes units or modules configured to perform the steps in any one of the first aspect or the possible implementations of the first aspect. For example, the apparatus includes a sensor sensing module and a path planning module.

According to a fourth aspect, a data processing apparatus is provided. The apparatus includes units or modules configured to perform the steps in any one of the second aspect or the possible implementations of the second aspect. For example, the apparatus includes a sensor sensing module and a path planning module.

According to a fifth aspect, a data processing apparatus is provided. The apparatus includes at least one processor and a memory, and the at least one processor is configured to perform the method in any one of the first aspect or the possible implementations of the first aspect.

According to a sixth aspect, a data processing apparatus is provided. The apparatus includes at least one processor and a memory, and the at least one processor is configured to perform the method in any one of the second aspect or the possible implementations of the second aspect.

According to a seventh aspect, a data processing apparatus is provided. The apparatus includes at least one processor and an interface circuit, and the at least one processor is configured to perform the method in any one of the first aspect or the possible implementations of the first aspect.

According to an eighth aspect, a data processing apparatus is provided. The apparatus includes at least one processor and an interface circuit, and the at least one processor is configured to perform the method in any one of the second aspect or the possible implementations of the second aspect.

According to a ninth aspect, a mobile device is provided. The mobile device includes the data processing apparatus provided in the third aspect, the fifth aspect, or the seventh aspect, and/or the data processing apparatus provided in the fourth aspect, the sixth aspect, or the eighth aspect. Optionally, the mobile device may be a vehicle, an airplane, or the like.

According to a tenth aspect, a computer program product is provided. The computer program product includes a computer program, and when being executed by a processor, the computer program is used to perform the method in any one of the first aspect or the possible implementations of the first aspect, or perform the method in any one of the second aspect or the possible implementations of the second aspect.

According to an eleventh aspect, a computer-readable storage medium is provided. The computer-readable storage medium stores a computer program, and when being executed, the computer program is used to perform the method in any one of the first aspect or the possible implementations of the first aspect, or perform the method in any one of the second aspect or the possible implementations of the second aspect.

According to a twelfth aspect, a chip or an integrated circuit is provided. The chip or the integrated circuit includes a processor, configured to invoke a computer program from a memory and run the computer program, so that a device on which the chip or the integrated circuit is installed performs the method in any one of the first aspect or the possible implementations of the first aspect, or performs the method in any one of the second aspect or the possible implementations of the second aspect. Optionally, the chip may be a chip in an in-vehicle processor.

According to the data processing method and apparatus provided in embodiments of this application, in a parking scenario, a plurality of homography matrices are preconfigured or predefined, and different homography matrices correspond to different regions in an image obtained by an in-vehicle camera. After a parking state is determined, image information of a feature region that corresponds to the parking state and that is of a to-be-detected target in the image obtained by the in-vehicle camera is processed by using a specific homography matrix corresponding to the parking state, to obtain a detection result, and perform parking based on the detection result. With same computing power and performance overheads, better parameter constraint may be performed on regions that correspond to different parking states and in which to-be-detected targets are located in the image, to improve detection precision and location precision of the region, thereby improving a parking success rate.

DESCRIPTION OF EMBODIMENTS

The following describes technical solutions in this application with reference to accompanying drawings.

In descriptions of the embodiments of this application, "I" means "or" unless otherwise specified. For example, A/B may represent A or B. In this specification, "and/or" describes only an association relationship of associated objects and represents that three relationships may exist. For example, A and/or B may represent the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an indication or implication of relative importance or an implicit indication of a quantity of indicated technical features. Therefore, a feature limited by "first" or "second" may explicitly or implicitly include one or more such features. In the descriptions of embodiments of this application, unless otherwise specified, "a plurality of" means two or more.

In addition, various aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to: a magnetic storage component (for example, a hard disk, a floppy disk, or a magnetic tape), an optical disc (for example, a compact disc (compact disc, CD) or a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may represent one or more devices and/or other machine-readable media that are configured to store information. The term "machine-readable storage media" may include but is not limited to a wireless channel, and various other media that can store, include, and/or carry instructions and/or data.

With progress of science and technology and development of artificial intelligence, people have increasingly high expectations for an intelligent connectivity level of vehicle driving and intelligent assisted driving of a vehicle. Therefore, various intelligent assisted driving functions of the vehicle emerge, for example, an in-vehicle surround-view system. The in-vehicle surround-view system uses a panoramic surround-view camera to allow a user to view a panoramic bird's eye view of an ambient environment of the vehicle on an in-vehicle central display screen at 360° without blind spots, to ensure driving safety.

Figure 1:
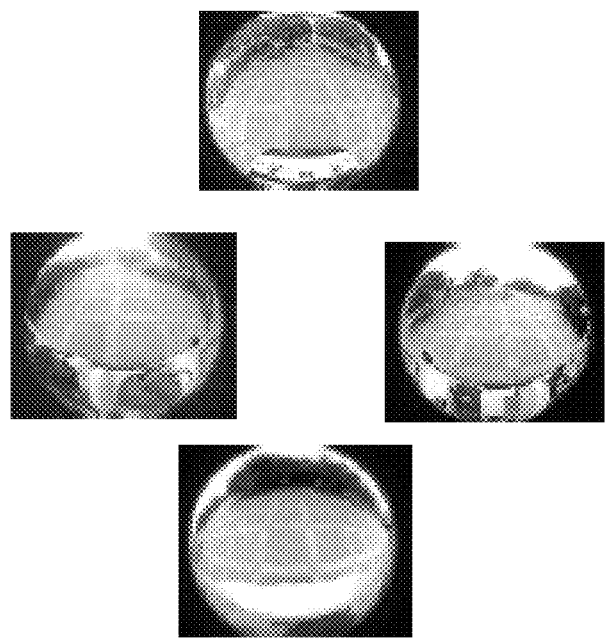
FIG. 1 shows images separately captured by four fisheye cameras installed around a vehicle body.
Figure 2:
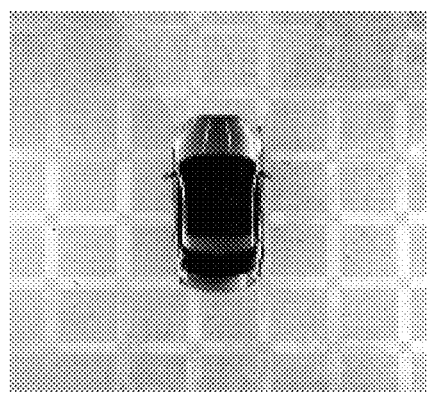
FIG. 2 is a panoramic bird's eye view (in-vehicle surround view) of an ambient environment of a vehicle that is displayed on an in-vehicle central display screen.

A working principle of the in-vehicle surround-view system is: separately performing photographing by using a plurality of wide-angle cameras (for example, fisheye cameras) installed at different locations of a vehicle body, to obtain a plurality of images of different orientation angles of view of the vehicle, and then stitching these images to obtain a panoramic surround-view image. For example, FIG. 1 shows images separately captured by four fisheye cameras installed around a vehicle body. FIG. 2 is a panoramic bird's eye view of an ambient environment of a vehicle that is displayed on an in-vehicle central display screen.

Currently, steps of generating an in-vehicle surround view (which may also be referred to as a panoramic bird's eye view) mainly include:

Distortion correction: A fisheye camera is calibrated to obtain an intrinsic parameter and a distortion coefficient of the fisheye camera and an extrinsic parameter of the fisheye camera relative to a calibration object. An image captured by the corrected fisheye camera is obtained based on the obtained parameters and a fisheye distortion model by using a correction method. Camera calibration is a process in which a camera obtains camera information such as an intrinsic parameter, a distortion parameter, and an extrinsic parameter of the camera by photographing calibration objects (for example, a black-and-white checkerboard) at different specific locations.

Bird's-eye-view transformation: Bird's-eye-view transformation is completed by solving a homography matrix, to obtain a bird's eye view corresponding to the image of the corrected fisheye camera.

Panoramic stitching: Image stitching is performed on bird's eye views of four fisheye cameras by using a corresponding image relationship between overlapping regions of the four bird's eye views according to an image fusion and stitching algorithm, to obtain a surround view.

The entire process of generating the in-vehicle surround view is pixel coordinate conversion from the original image of the fisheye camera to the surround view. A pixel mapping relationship from the original image of the fisheye camera to the bird's eye view can be obtained in this process.

In computer vision, plane homography is defined as projection mapping from one plane to another plane. By using four groups of corresponding points on an original image and a target image, a corresponding homography matrix may be solved, to complete perspective transformation of the image. It may be understood that, once four feature points selected on the original image are determined, a homography matrix corresponding to the four feature points is also determined accordingly. By using the homography matrix, mapping from pixels on the original image to corresponding pixels on the target image can be implemented. A constructed homography matrix varies with feature points selected on the original image.

In an in-vehicle surround-view system, a homography matrix is constructed by using image coordinates of at least four groups of feature points on an original image captured by an in-vehicle camera and world location coordinates of corresponding feature points on a target image, to complete bird's-eye-view transformation. In addition, because ranging based on an in-vehicle surround view is performed through calibration of an extrinsic parameter of the camera, after bird's-eye-view transformation and panoramic stitching are performed, location information in the real world that corresponds to each pixel in the in-vehicle surround view may be further obtained.

Figures 3, 4:
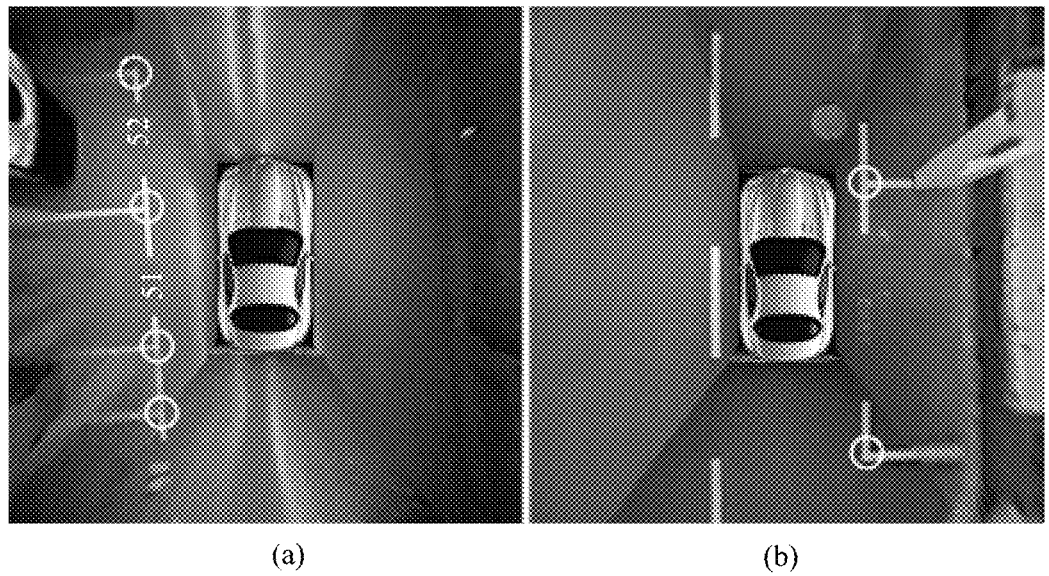
FIG. 3 is a schematic diagram of different regions in an in-vehicle surround view.
FIG. 4 is a schematic diagram of detecting a parking space in an in-vehicle surround view by using a neural network.

FIG. 3 is a schematic diagram of different regions in an obtained in-vehicle surround view. As shown in FIG. 3, eight regions are included in total, relative locations of the eight regions are locations of a vehicle, and the eight regions are respectively left front, front, right front, left, right, left rear, rear, and right rear. The front region, the left region, the rear region, and the right region are respectively obtained after bird's-eye-view transformation is performed on images captured by fisheye cameras installed at front, left, rear, and right locations of a vehicle body. The left front of an overlapping region is obtained by performing bird's-eye-view transformation and stitching on images captured by the left camera and the front camera. The left rear of the overlapping region is obtained by performing bird's-eye-view transformation and stitching on images captured by the left camera and the rear camera. The right front of the overlapping region is obtained by performing bird's-eye-view transformation and stitching on images captured by the right camera and the front camera. The right rear of the overlapping region is obtained by performing bird's-eye-view transformation and stitching on images captured by the right camera and the rear camera. For each fisheye camera, one homography matrix is used for bird's-eye-view transformation. Because a single homography matrix has good precision only for a plane in which four feature points selected during calibration are located. Currently, a homography matrix is determined by using four feature points at a near end of an image captured by a fisheye camera, and bird's-eye-view transformation of the entire image obtained by the fisheye camera is completed by using the homography matrix.

After an in-vehicle surround view is obtained, a target object in the in-vehicle surround view may be further detected based on a neural network. The target object may include a parking space mark, a ground lock, a road edge, and the like. For example, in an automatic parking scenario, one of target detection objects of the neural network is a parking space mark, and parking space information may be obtained through post-processing by using the detected parking space mark in the in-vehicle surround view. The parking space mark is a graph drawn on the ground to indicate an effective parking region. Based on a parking space marking method, a parking space is found by identifying a visual parking space mark in an image sequence obtained by a camera installed on a vehicle. Therefore, performance of the method does not depend on the presence or posture of an adjacent vehicle. For example, (a) in FIG. 4 is a schematic diagram of detecting a rear parking space in an in-vehicle surround view by using a neural network. (b) in FIG. 4 is a schematic diagram of detecting a side parking space in an in-vehicle surround view by using a neural network.

A detection result of the neural network in the in-vehicle surround view indicates a location of a detected target in the view. In an in-vehicle surround-view system, a relationship between pixel coordinates of an image and coordinates of the real world may be obtained, and a location of the detected object (for example, a parking space) in the real world may be obtained.

In addition to parking space identification, based on different sample sets of the neural network, the neural network may be used to obtain different training models based on different sample sets, and detect different targets to obtain corresponding detection results, for example, obstacle detection, human detection, and detection of other objects.

Generally, an in-vehicle sensor sensing module in an in-vehicle chip detects a parking space, an obstacle, or the like by using a neural network based on a surround view. The in-vehicle sensor is connected to the in-vehicle chip by using a physical circuit. The in-vehicle sensor includes, for example, an in-vehicle camera (or referred to as a camera), an in-vehicle radar, and the like. The neural network may be used to obtain a type of a detected target and image location information of the detected target in the surround view. Through conversion between image coordinates and world coordinates (a corresponding conversion relationship may be obtained in the in-vehicle surround-view system), a detected parking space and world location information thereof are output. The sensor sensing module transmits the parking space and the world location information thereof to a path planning module in the in-vehicle chip. The path planning module may plan a parking path based on the obtained parking space information. During parking, parking state information may be obtained in real time based on a pre-planned path, and real-time information that is output by a wheel speedometer and the sensor sensing module. The parking state information means different parking processes such as a parking space searching process and a vehicle parking process during automatic parking, to perform automatic parking.

It can be learned that vehicle path planning precision during parking depends on accuracy of a target type and location information that are output by the sensor sensing module. A region (or location) of a to-be-detected target (for example, a parking space or an obstacle) in the surround view varies with a parking state, and the region in which the to-be-detected target is located in the surround view may be referred to as a feature region or a sensitive region. That is, different parking states correspond to different feature regions, and a relatively high detection precision requirement is imposed on a feature region corresponding to a specific parking state. However, currently, for a surround view in an in-vehicle surround-view system, one in-vehicle camera uses only one homography matrix to perform bird's-eye-view transformation. During calibration, the homography matrix is determined by using four feature points at a near end of an image, and has relatively good precision only for a plane in which the feature points during calibration are located, that is, has relatively good precision for the near end of the image, and has relatively poor precision for a far end of the image. Consequently, a ranging error for the far end of the image is relatively large. In addition, due to impact of ground flatness, camera distortion, and parking environment during calibration, parameter configuration of a single homography matrix in actual use is not ideal for calibration results of an overlapping region and the far end. That is, homography matrices corresponding to different parking states are the same, and detection precision requirements of different parking states for different feature regions cannot be met. For example, when a parking space is at a far end of the surround view, because the surround view is processed by determining the homography matrix by using the four feature points at the near end of the image, precision for the far end of the image is very poor, resulting in poor parking precision, and seriously affecting accuracy of the target type and the location information that are output by the sensor sensing module. Consequently, parking precision is reduced.

Figure 5:
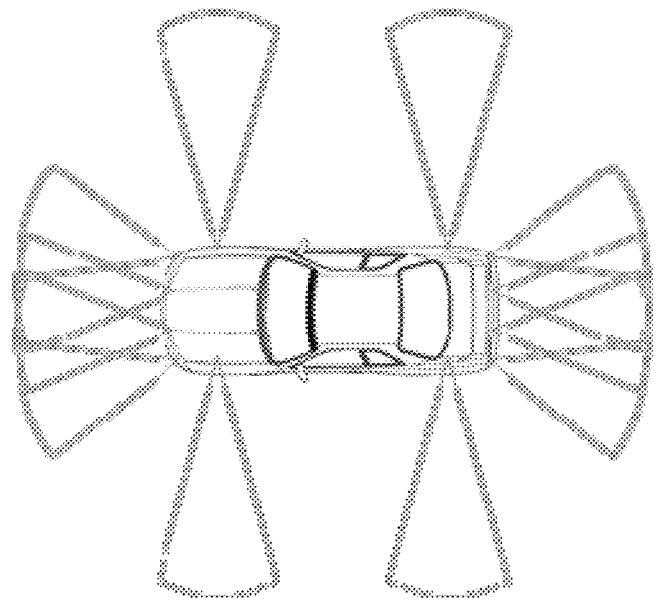
FIG. 5 is a schematic diagram of 12 ultrasonic radars installed around a vehicle body.

In addition to the foregoing fisheye camera, a plurality of in-vehicle ultrasonic radars may be further installed on the vehicle body. For example, as shown in FIG. 5, 12 ultrasonic radars installed around the vehicle body are used to detect obstacles around the vehicle body. Common ultrasonic radars are classified into two types:

Ultrasonic parking radars that are installed on front and rear bumpers of the vehicle and that are used to measure front and rear obstacles may also be referred to as ultrasonic parking assistant (ultrasonic parking assist, UPA) radars.

Ultrasonic radars that are installed on sides of the vehicle body and that are used to measure side obstacles may also be referred to as auto parking assist (Auto Parking Assist, APA) ultrasonic radars.

During parking, four UPA ultrasonic radars at the rear of the vehicle body are mainly used to detect distances from the rear of the vehicle to obstacles. During parking, the four UPA radars at the rear of the vehicle body are used to implement a single-receive single-transmit operation during reversing. Table 1 shows transmit/receive states of the four ultrasonic radars at the rear of the vehicle body during parking. In Table 1, TX represents transmit, and RX represents receive. To be specific, at a same time, only one ultrasonic radar performs sending and receiving, and the other three ultrasonic radars do not work. In other words, during parking, at a same time, only one of the four UPA radars at the rear of the vehicle body is turned on to work, and the other three are turned off. A transmit/receive time of each UPA ultrasonic radar is about 40 ms.

TABLE 1

Numbers and transmit/receive states of ultrasonic radars at the rear of a vehicle

| Numbers of the ultrasonic radars at the rear of the vehicle | Transmit/receive states | | | |
|---|---|---|---|---|
| 1 | TX-RX | — | — | — |
| 2 | — | TX-RX | — | — |
| 3 | — | — | TX-RX | — |
| 4 | — | — | — | TX-RX |

During parking, when an obstacle is approaching, a very high requirement is imposed on distance precision. Because an ultrasonic wave is a sector wave, single-transmit single-receive causes a case in which real-time performance and accuracy of returned ranging information cannot meet the requirement when a distance from the obstacle is relatively short. Consequently, parking precision is reduced.

Based on the foregoing problem, this application provides a data processing method. A plurality of homography matrices are preconfigured or predefined, so that different homography matrices correspond to different parking states. In other words, different homography matrices correspond to different regions in an image obtained by an in-vehicle camera. After a parking state is determined, image information of a feature region that corresponds to the parking state and that is of a to-be-detected target in the image obtained by the in-vehicle camera is processed by using a specific homography matrix corresponding to the parking state, to obtain a detection result, and perform parking based on the detection result. With same computing power and performance overheads, better parameter constraint may be performed on regions that correspond to different parking states and in which to-be-detected targets are located in the image, to improve detection precision and location precision of the region, thereby improving a parking success rate.

The data processing method provided in this application may be applied to an automatic parking scenario of a mobile device. In embodiments of this application, the mobile device may include a device, such as a vehicle or an airplane, whose spatial location may be moved by using a human operation. A specific form of the mobile device is not limited in this application.

Figure 6:
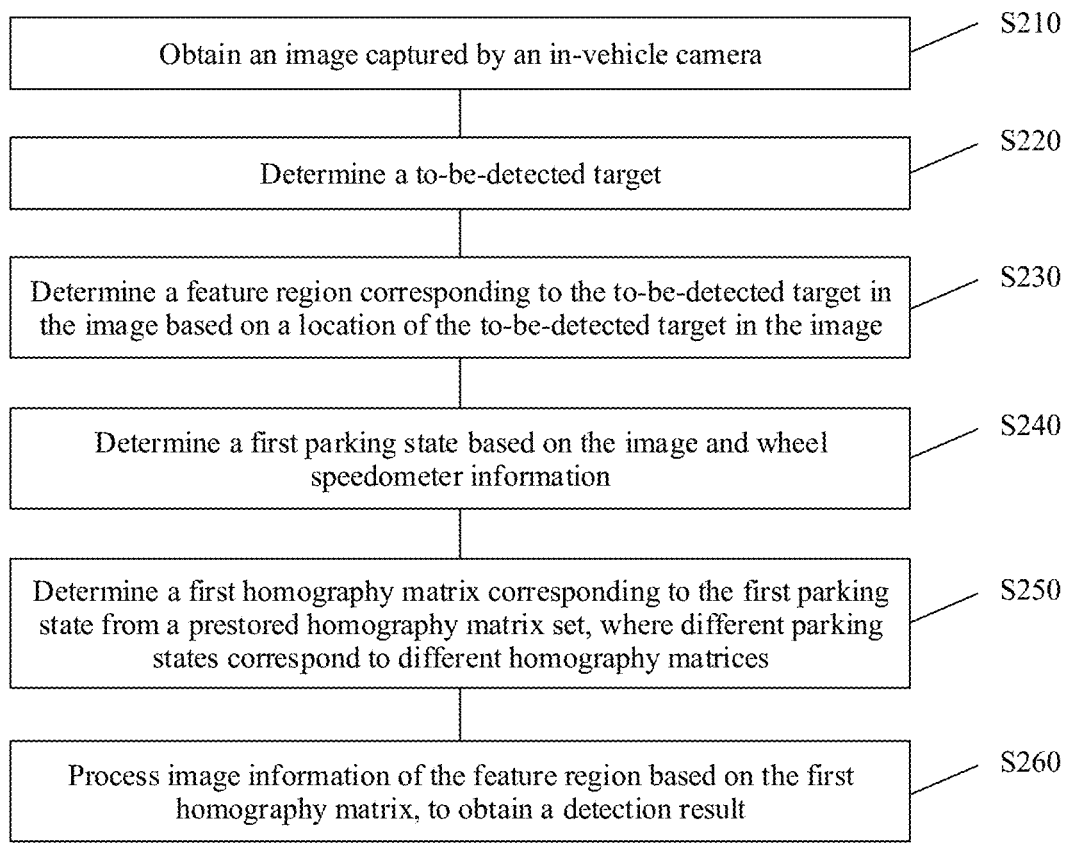
FIG. 6 is a schematic flowchart of a data processing method according to an embodiment of this application.

The following describes in detail the data processing method provided in this application with reference to FIG. 6. FIG. 6 is a schematic flowchart of a data processing method 200 according to an embodiment of this application.

It should be understood that the data processing method provided in this application may be performed by a parking apparatus integrated into a mobile device (for example, a vehicle). For example, the parking apparatus may be a driver assistant apparatus, a driver assistant module (unit), or a driver assistant system, or the parking apparatus may be integrated into the driver assistant apparatus, the driver assistant module (unit), or the driver assistant system. Alternatively, the data processing method provided in this application may be performed by a chip or an integrated circuit in the vehicle. For example, the chip may be a chip in an in-vehicle processor. Alternatively, the data processing method provided in this application may be performed by the vehicle, and the foregoing chip or integrated circuit is integrated into the vehicle.

Optionally, the driver assistant apparatus or the driver assistant system may further include at least one of an advanced driver assistant system (advanced driver assistant system, ADAS), an autonomous driving (autonomous driving, AD) system, or a driver assistant system that includes at least one driver assistant function. This is not limited in this application. As an example instead of a limitation, the method may be performed by a chip, a chip system, a processor, or the like used in the driver assistant apparatus or the driver assistant system.

It should be further understood that, in the following descriptions, the vehicle is used as an example to describe the data processing method provided in this application. It may be understood that the method may be further applied to another mobile device. This is not limited in this application.

As shown in FIG. 6, the method 200 shown in FIG. 6 may include S210 to S260. The following describes the steps in the method 200 in detail with reference to FIG. 6.

S210: Obtain an image captured by an in-vehicle camera.

S220: Determine a to-be-detected target.

S230: Determine a feature region corresponding to the to-be-detected target in the image based on a location of the to-be-detected target in the image.

S240: Determine a first parking state based on the image and wheel speedometer information.

S250: Determine a first homography matrix corresponding to the first parking state from a prestored homography matrix set, where different parking states correspond to different homography matrices.

S260: Process image information of the feature region based on the first homography matrix, to obtain a detection result.

In S210, during parking of a vehicle, the in-vehicle camera may capture an image around the vehicle in real time. For example, FIG. 1 shows images separately captured by four fisheye cameras installed around a vehicle body. After an image (or a picture) captured by the in-vehicle camera is obtained, a preconfigured (or default) homography matrix is used to perform bird's-eye-view transformation on the image captured by the in-vehicle camera, to obtain a bird's eye view corresponding to the image of the camera, and then image stitching is performed on bird's eye views of four cameras by using a corresponding image relationship between overlapping regions of the four bird's eye views according to an image fusion and stitching algorithm, to obtain an in-vehicle surround view.

In S220, after the in-vehicle surround view is obtained, a to-be-detected target in the in-vehicle surround view may be further determined based on a neural network. The to-be-detected target may include a parking space mark (a parking space) and an obstacle (for example, a ground lock or a road edge). A specific type of the to-be-detected target is not limited in this embodiment of this application. The parking space mark is used as an example for description, and parking space information may be obtained through post-processing by using the detected parking space mark in the in-vehicle surround view. The parking space information may include, for example, a type of a parking space (a side parking space or a rear parking space), and a location of the parking space in the image.

In S230, a location of the to-be-detected target (for example, the parking space) in the in-vehicle surround view may be determined based on a distance from the to-be-detected target (for example, the parking space) to the vehicle body in the in-vehicle surround view, to determine a feature region in which the to-be-detected target is located in the in-vehicle surround view. In other words, the distance from the to-be-detected target to the vehicle body varies with a feature region. In this embodiment of this application, the feature region may also be referred to as a sensitive region. The sensitive region may be understood as a region in which a sensor sensing module performs target detection in the surround view in different parking states. That is, in the parking states, detected targets (for example, parking spaces or obstacles) are concentrated in the sensitive region.

The distance from the to-be-detected target to the vehicle body in the image (for example, the in-vehicle surround view) varies with a parking state. For example, when a current parking state (that is, the first parking state) is a vehicle searching process, the to-be-detected target may be in a region on the right or left side that is 2 m away from a center axle of the vehicle in the image (for example, the in-vehicle surround view). When the current parking state is a vehicle parking state, the to-be-detected target may be in a region within 2 m around the vehicle body in the image (for example, the in-vehicle surround view). In other words, the location of the to-be-detected target in the image (for example, the in-vehicle surround view) varies with a parking state, and a region in which the to-be-detected target is located in the image (for example, the in-vehicle surround view) varies with a parking state. Therefore, different parking states correspond to different feature regions. When the parking state changes, the corresponding feature region also changes. Therefore, the corresponding homography matrix also changes.

In S240, a parking state (the first parking state) may be determined based on the in-vehicle surround view, the wheel speedometer information, vehicle posture information, vehicle planning control information, and the like. Optionally, the first parking state may be a parking space searching state or a vehicle parking state. It should be understood that, in this embodiment of this application, the first parking state may alternatively be more other parking states, for example, a far-end parking space searching state and a near-end parking space searching state. This is not limited in this embodiment of this application.

In S250, the first homography matrix corresponding to the first parking state may be determined from the prestored or predefined homography matrix set. The homography matrix set includes a plurality of homography matrices, and different parking states correspond to different homography matrices. The distance from the to-be-detected target to the vehicle body in the image (for example, the in-vehicle surround view) varies with a parking state. In other words, different feature regions may be determined based on different distances from the to-be-detected target to the vehicle body. For example, the first parking state corresponds to the first homography matrix. In the first parking state, the distance from the to-be-detected target to the vehicle body in the image (for example, the in-vehicle surround view) is $L_1$, and the region in which the to-be-detected target is located in the image is a first feature region. A second parking state corresponds to a second homography matrix. In the second parking state, the distance from the to-be-detected target to the vehicle body in the image (for example, the in-vehicle surround view) is $L_2$, and the region in which the to-be-detected target is located in the image is a second feature region, where $L_1$ is not equal to $L_2$. That is, different feature regions correspond to different homography matrices. Optionally, the image (for example, the in-vehicle surround view) may include a plurality of feature regions.

For example, in an automatic parking scenario, a parking system has different sensing precision requirements for regions at different locations away from the vehicle body. It is assumed that the in-vehicle surround view is divided into different regions, and each region has a different distance from the vehicle body in the in-vehicle surround view. That is, for images of a plurality of cameras of the vehicle body obtained after bird's-eye-view transformation and regions with different distances from the vehicle body, different homography matrices are obtained by calibrating feature points in different regions. After a feature region in which the to-be-detected target (for example, the parking space) is located in the in-vehicle surround view is determined, a parking state may be further determined, to determine a homography matrix corresponding to the parking state, that is, the homography matrix corresponding to the feature region. For example, a feature region corresponding to the vehicle parking state is a region with a relatively short distance (less than or equal to a preset threshold) from the vehicle body, and the vehicle parking state corresponds to a near-end homography matrix. A feature region corresponding to the parking space searching process is a region with a relatively long distance (greater than the preset threshold) from the vehicle body, and the parking space searching process corresponds to a far-end homography matrix. It should be understood that, in this embodiment of this application, there may be more different parking states, and distances from feature regions corresponding to different parking states to the vehicle body in the in-vehicle surround view are different. In other words, the in-vehicle surround view may be divided into more feature regions, and each feature region corresponds to a different homography matrix.

The in-vehicle surround view is obtained by performing bird's-eye-view transformation and panoramic stitching on images captured by a plurality of cameras. That is, for an image captured by each camera, different homography matrices are obtained by calibrating feature points in different regions in the image that have different distances from the vehicle body. In other words, for different regions, different homography matrices may be used to perform bird's-eye-view transformation. When different homography matrices are determined, feature points selected on an image captured by a camera are also different. For example, for an image captured by a camera, a near-end homography matrix may be determined by using four feature points at a near end of the image, and a far-end homography matrix may be determined by using four feature points at a far end of the image. It should be understood that the distance from the vehicle body in the image may be further divided based on a precision requirement, that is, each camera may correspond to more than two homography matrices, and different regions in the image captured by the camera are processed by using the plurality of homography matrices.

In S260, after the first homography matrix corresponding to the first parking state is determined, image information of the first feature region may be processed by using the first homography matrix, to obtain a detection result. The first feature region may be understood as a region in which the to-be-detected target corresponding to the first parking state is located in the in-vehicle surround view. For example, the first homography matrix is used to perform bird's-eye-view transformation on the image of the first feature region, to obtain a corresponding bird's eye view, and then image stitching is performed on bird's eye views of four cameras by using a corresponding image relationship between overlapping regions of the four bird's eye views according to an image fusion and stitching algorithm, to obtain a new in-vehicle surround view. A parking space, an obstacle, and the like in the new in-vehicle surround view are detected based on the new in-vehicle surround view by using the neural network, to plan a parking path and perform subsequent parking.

According to the data processing method provided in this application, a plurality of homography matrices are preconfigured or predefined based on different precision requirements during parking, and different homography matrices correspond to different parking states. After a parking state is determined, image information of a feature region that corresponds to the parking state and that is of a to-be-detected target in an image is processed by using a specific homography matrix corresponding to the parking state, to obtain a detection result. Better parameter constraint may be performed on the feature region in which the to-be-detected target is located in the image, to improve detection precision and location precision of the feature region, thereby improving a parking success rate.

It should be understood that, in this embodiment of this application, after the feature region corresponding to the parking state is determined, because there is no detection requirement for another region in a surround view, resolution of an image of the another region may be reduced or an image of the another region is directly not output, and computing power overheads of an in-vehicle chip are used for parameter configuration of the homography matrix of the feature region and image generation.

The following provides description with reference to specific examples.

During parking, when detecting a detected target (for example, a parking space or an obstacle) during parking, a sensor sensing module in the in-vehicle chip outputs detection information to a path planning module in the in-vehicle chip. The detection information includes a target type, a world location, and the like. For example, the sensor sensing module may detect a parking space in the surround view by using a pre-trained neural network model based on an in-vehicle surround view generated by an in-vehicle surround-view system. The neural network may be used to obtain a type of a detected target and image location information of the detected target in the surround view. Through conversion between image coordinates and world coordinates, a detected parking space and world location information thereof are output to the path planning module.

The path planning module obtains current parking state information, for example, a parking space searching process or a vehicle parking process. For example, the path planning module may determine the current parking state information based on information from a wheel speedometer, a parking space and world location information thereof, vehicle planning and control information, or another information source, and send the parking state information to the sensor sensing module.

The sensor sensing module receives the parking state information, dynamically configures different homography matrices based on different parking state information, and outputs a detection result to the path planning module based on the configured homography matrix.

Figure 7:
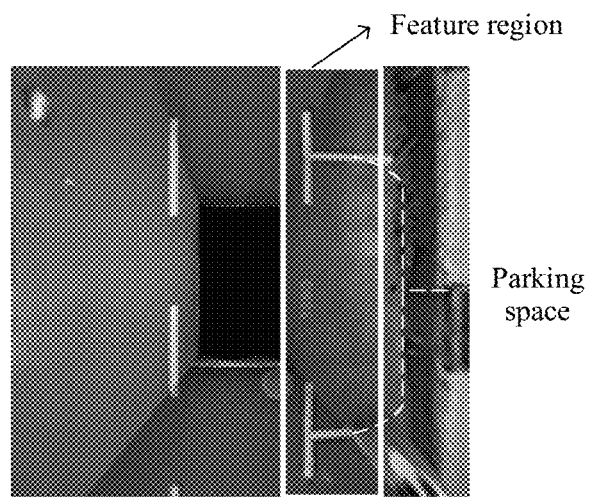
FIG. 7 is a schematic diagram of a vehicle searching process in a side parking space according to an embodiment of this application.

For example, if the vehicle travels on one side of the parking space, the path planning module determines that the current parking state is a vehicle searching process. FIG. 7 is a schematic diagram of a vehicle searching process in a side parking space. In this case, the sensor sensing module detects that the parking space is on the right of the vehicle body, and defines the feature region (which may also be referred to as a sensitive region) as a region (shown by a white-framed box in FIG. 7) on the right side that is 1 m to 3 m away from the center axle of the vehicle. The homography matrix is configured as a homography matrix corresponding to the vehicle searching process. In addition, image resolution of the feature region is improved. For another region than the feature region, resolution is reduced or an image is not output, until the parking state is released.

Figure 8:
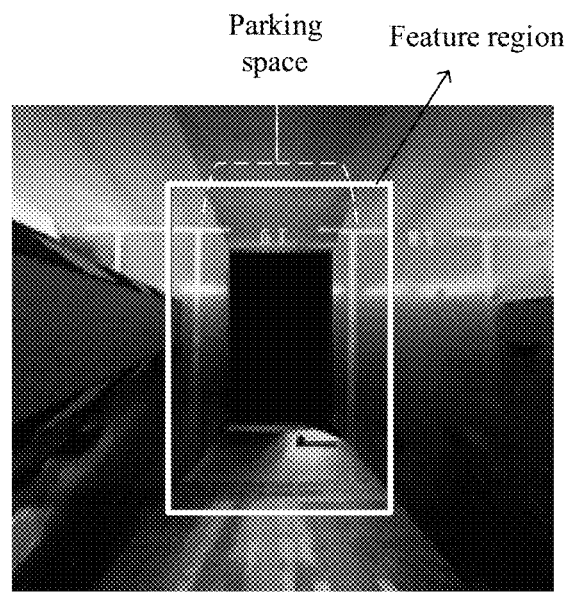
FIG. 8 is a schematic diagram of a vehicle parking process in a rear parking space according to an embodiment of this application.

After the parking space is selected for the vehicle, the path planning module determines that the current parking state is a vehicle parking process. In this case, the sensor sensing module detects that a parking space is the parking space. FIG. 8 is a schematic diagram of a vehicle parking process in a rear parking space. The sensor sensing module defines the feature region as a region within 2 m around the vehicle body (shown by a white-framed box in FIG. 8). The homography matrix is configured as a homography matrix corresponding to the vehicle parking process, and resolution of the feature region is improved. For another region than the feature region, resolution is reduced or an image is not output, until the parking state is released.

Optionally, in this embodiment of this application, the in-vehicle surround view may be divided into a plurality of different feature regions, and distances from to-be-detected targets in any two feature regions to the vehicle body are different. It is assumed that the in-vehicle surround view is divided into a first feature region and a second feature region based on a precision requirement, and a distance from a to-be-detected target in the first feature region to the vehicle body is greater than a distance from a to-be-detected target in the second feature region to the vehicle body. In this case, when the parking state is the parking space searching state, the feature region of the to-be-detected target in the image is the first feature region, and the parking space searching state corresponds to a far-end homography matrix. When the parking state is the vehicle parking state, the feature region of the to-be-detected target in the image is the second feature region, and the vehicle parking state corresponds to a near-end homography matrix. That is, the first feature region corresponds to the far-end homography matrix, and the second feature region corresponds to the near-end homography matrix. For example, in the foregoing example, the feature region shown in the white-framed box in FIG. 7 may be the first feature region, and the feature region shown in the white-framed box in FIG. 8 may be the second feature region. Different feature regions correspond to different homography matrices.

According to the data processing method provided in this application, dynamic homography matrix configuration is performed based on different parking states, and a homography matrix is enabled for image processing based on different parking states during parking. In addition, resolution of an image of another region can be reduced or an image of another region is directly not output, to reduce computing power overheads and energy consumption of an in-vehicle chip, and improve computing efficiency.

Figure 9:
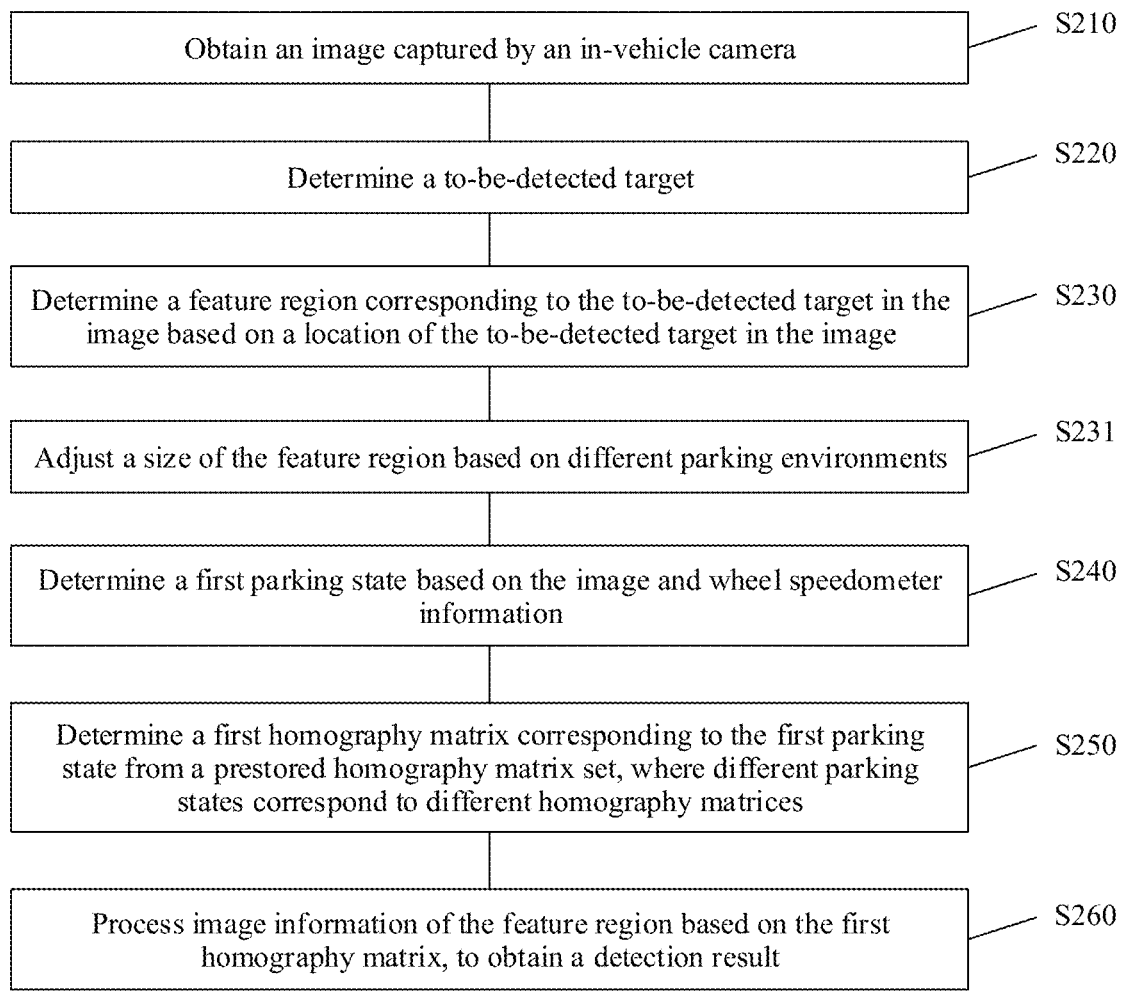
FIG. 9 is a schematic flowchart of another data processing method according to an embodiment of this application.

In some possible implementations of this application, FIG. 9 is a schematic flowchart of a data processing method according to some embodiments of this application. Based on the method steps shown in FIG. 6, the method 200 further includes S231.

S231: Adjust a size of the feature region based on different parking environments.

For steps S210 to S260 shown in FIG. 9, refer to the foregoing related descriptions of S210 to S260. For brevity, details are not described herein again.

Specifically, for example, a sensor sensing module in an in-vehicle chip may obtain different parking environments. Optionally, in this embodiment of this application, the parking environment includes at least one of a weather condition during parking, a ground condition during parking, an ambient environment of a vehicle during parking, or another type of parking environment. The sensor sensing module may dynamically adjust a range and the size of the feature region based on different parking environments. After a homography matrix is determined based on s parking state, image information of the feature region is processed by using the homography matrix, to obtain a detection result, for example, a parking space type and world location information, and parking is performed based on the detection result.

The following uses an example in which the parking state is a parking space searching process in different weather conditions for description.

Figure 10:
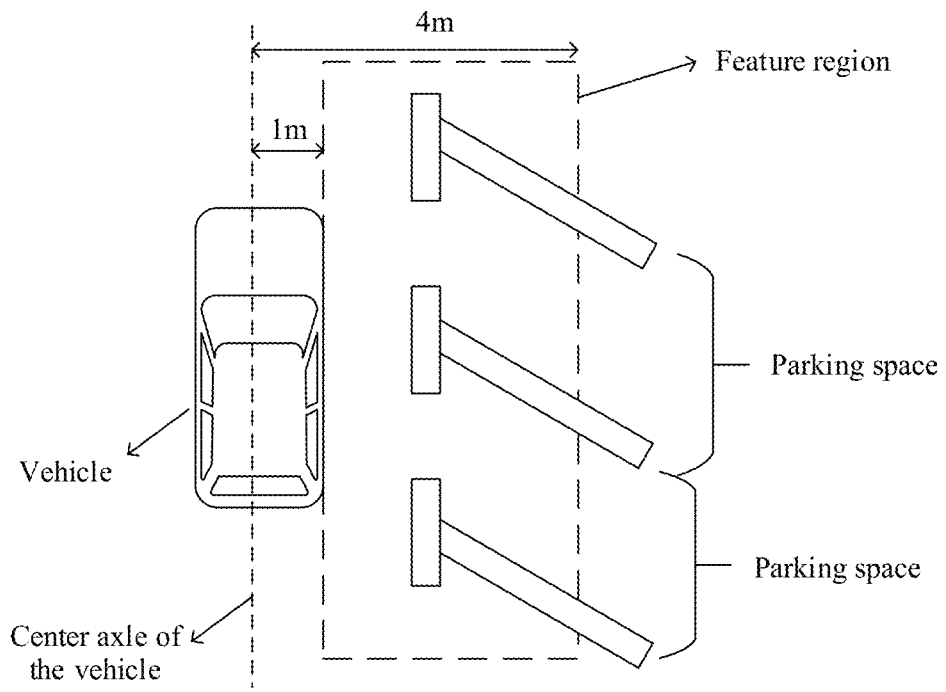
FIG. 10 is a schematic diagram of a feature region in a case of an oblique parking space and a rainy day according to an embodiment of this application.

FIG. 10 shows an oblique parking space. A path planning module determines that the current parking state information is a parking space searching process, and the sensor sensing module determines that the weather condition is a rainy day. In this case, the feature region is adjusted to a region on the right side that is 1 m to 4 m away from a center axle of a vehicle.

Figure 11:
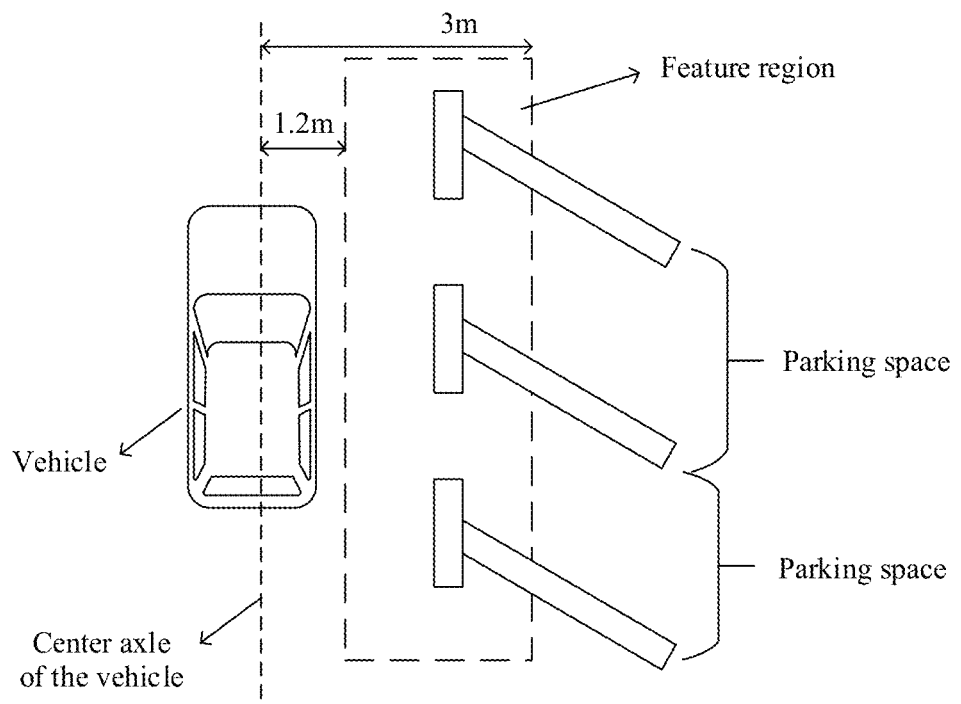
FIG. 11 is a schematic diagram of a feature region in a case of an oblique parking space and a sunny day according to an embodiment of this application.

FIG. 11 shows an oblique parking space that is the same as that in FIG. 10. The path planning module determines that the current parking state information is a parking space searching process, and the sensor sensing module determines that the weather condition is a sunny day. In this case, the feature region is adjusted to a region on the right side that is 1.2 m to 3 m away from a center axle of a vehicle.

A size of the feature region is adjusted based on different parking environments, so that higher detection precision and higher location precision can be achieved, and parking precision can be further improved.

Figure 12:
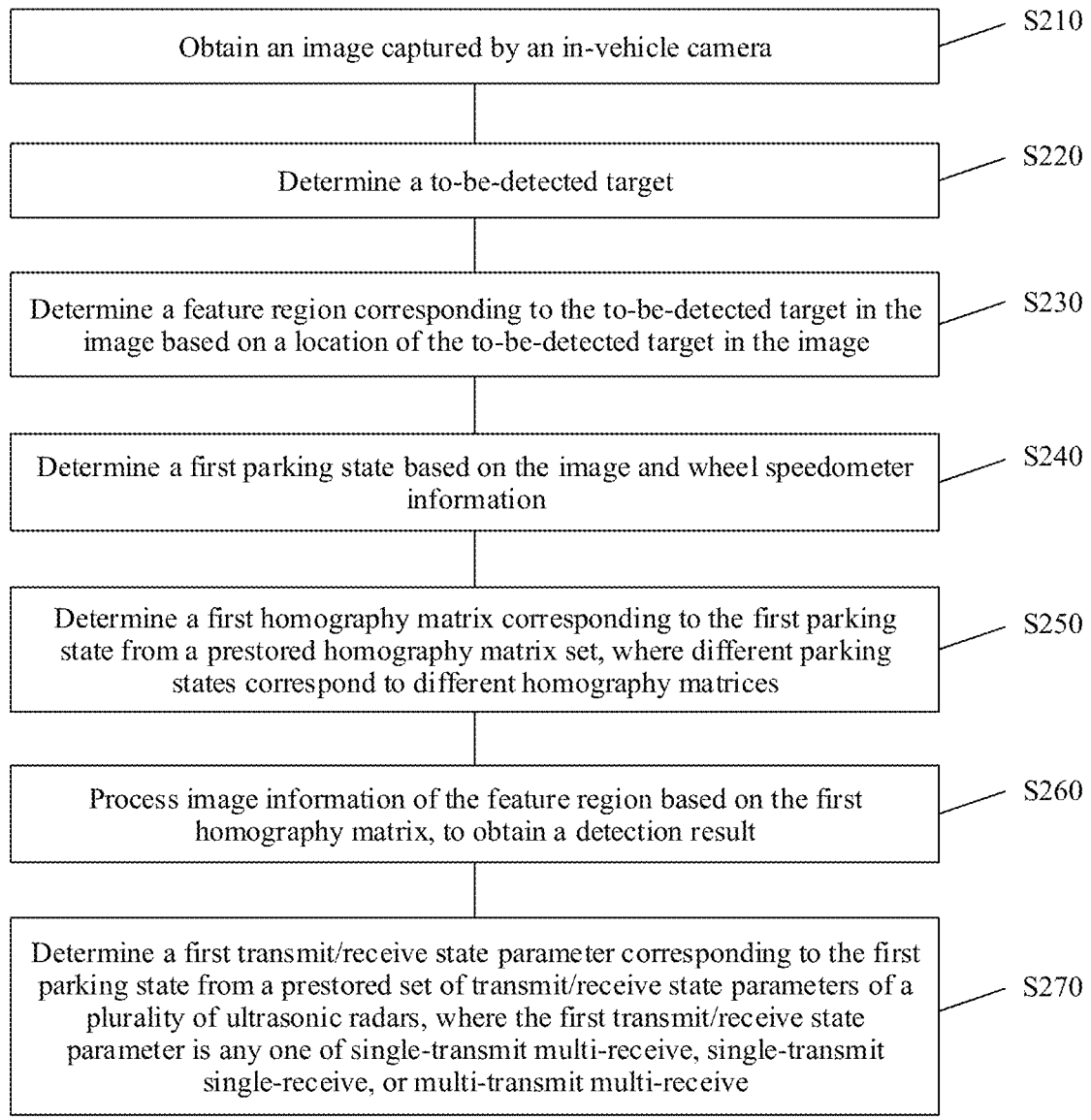
FIG. 12 is a schematic flowchart of still another data processing method according to an embodiment of this application.

In some possible implementations of this application, FIG. 12 is a schematic flowchart of a data processing method according to some embodiments of this application. Based on the method steps shown in FIG. 6, the method 200 further includes S270.

S270: Determine a first transmit/receive state parameter corresponding to the first parking state from a prestored set of transmit/receive state parameters of a plurality of ultrasonic radars, where the first transmit/receive state parameter is any one of single-transmit multi-receive, single-transmit single-receive, or multi-transmit multi-receive.

For steps S210 to S260 shown in FIG. 12, refer to the foregoing related descriptions of S210 to S260. For brevity, details are not described herein again.

A plurality of in-vehicle ultrasonic radars may be installed on a vehicle body. Therefore, during parking, four UPA ultrasonic radars at the rear of the vehicle body are mainly used to detect distances from the rear of the vehicle to obstacles. During parking, at a same time, only one of the four UPA radars at the rear of the vehicle body is turned on to work, that is, in a single-transmit single-receive working state. During parking, when an obstacle is approaching, a very high requirement is imposed on distance precision. Because an ultrasonic wave is a sector wave, single-transmit single-receive causes a case in which real-time performance and accuracy of returned ranging information cannot meet the requirement when a distance from the obstacle is relatively short. Consequently, parking precision is reduced.

Therefore, in S270, after the current parking state (that is, the first parking state) is determined, the first transmit/receive state parameters of the plurality of ultrasonic radars corresponding to the current parking state may be determined from the prestored set of the transmit/receive state parameter sets of the plurality of ultrasonic radars. Optionally, the plurality of ultrasonic radars may be four UPA radars at the rear of the vehicle body. The set of the transmit/receive state parameters of the plurality of ultrasonic radars includes: single-transmit multi-receive, single-transmit single-receive, and multi-transmit multi-receive. The first transmit/receive state parameter may be any one of single-transmit multi-receive, single-transmit single-receive, or multi-transmit multi-receive. Then, data or information obtained by the plurality of ultrasonic radars may be obtained by using the first transmit/receive state parameter, and parking is performed based on the data or the information.

Single-transmit multi-receive may be understood as follows: At a same time, one ultrasonic radar performs sending and receiving, and a plurality of other ultrasonic radars perform receiving. Single-transmit single-receive may be understood as follows: At a same time, one ultrasonic radar performs sending and receiving. Multi-transmit multi-receive may be understood as follows: At a same time, a plurality of ultrasonic radars perform sending and receiving.

For example, it is assumed that there are four UPA radars at the rear of the vehicle body, and different parking states correspond to different transmit/receive states of the four UPA radars. Table 2 shows single-transmit multi-receive states of the four ultrasonic radars at the rear of the vehicle body. TX represents transmit, and RX represents receive.

TABLE 2

Numbers and transmit/receive states of ultrasonic radars at the rear of a vehicle

| Numbers of the ultrasonic radars at the rear of the vehicle | Transmit/receive states | | | |
|---|---|---|---|---|
| 1 | TX-RX | RX | RX | RX |
| 2 | RX | TX-RX | RX | RX |
| 3 | RX | RX | TX-RX | RX |
| 4 | RX | RX | RX | TX-RX |

It should be understood that Table 2 merely shows an example of a single-transmit multi-receive state of an ultrasonic radar, and does not constitute a limitation on a quantity of ultrasonic radars and an ultrasonic radar that performs sending and receiving.

Optionally, in this embodiment of this application, when the parking state is a parking space searching state or another parking state than a vehicle parking state, the transmit/receive state parameters of the plurality of ultrasonic radars are single-transmit single-receive. Because the parking space searching state or the another parking state than the vehicle parking state does not have very high distance precision, the transmit/receive state parameters of the plurality of ultrasonic radars are configured as single-transmit single-receive, so that computing power overhead can be reduced when a parking requirement is met.

When the parking state is a vehicle parking state, the transmit/receive state parameters of the plurality of ultrasonic radars are single-transmit multi-receive or multi-transmit multi-receive. Because the vehicle parking state has relatively high distance precision, the transmit/receive state parameters of the plurality of ultrasonic radars are configured as single-transmit multi-receive or multi-transmit multi-receive, so that power can be increased in a short time, a plurality of ultrasonic waves can be received and sent at the same time, and a real-time information transmission amount and distance precision can be improved, thereby improving parking precision.

It should be understood that a correspondence between the set of the transmit/receive state parameters of the plurality of ultrasonic radars, each of the transmit/receive state parameters of the plurality of ultrasonic radars, and the parking state may be preconfigured or predefined.

According to the data processing method provided in this application, the homography matrix set and the set of the transmit/receive state parameters of the plurality of ultrasonic radars are preconfigured or predefined based on different precision requirements during parking. Different homography matrices correspond to different parking states, and different transmit/receive states correspond to different parking states. After a parking state is determined, image information of a feature region that corresponds to the parking state and that is of a to-be-detected target in the image is processed by using a specific homography matrix corresponding to the parking state, to obtain a detection result. In addition, data of the plurality of ultrasonic radars is obtained by using the transmit/receive state parameters of the plurality of ultrasonic radars corresponding to the parking state, and parking is performed based on the detection result and the data of the plurality of ultrasonic radars, so that parking precision and a success rate can be improved.

Figure 13:
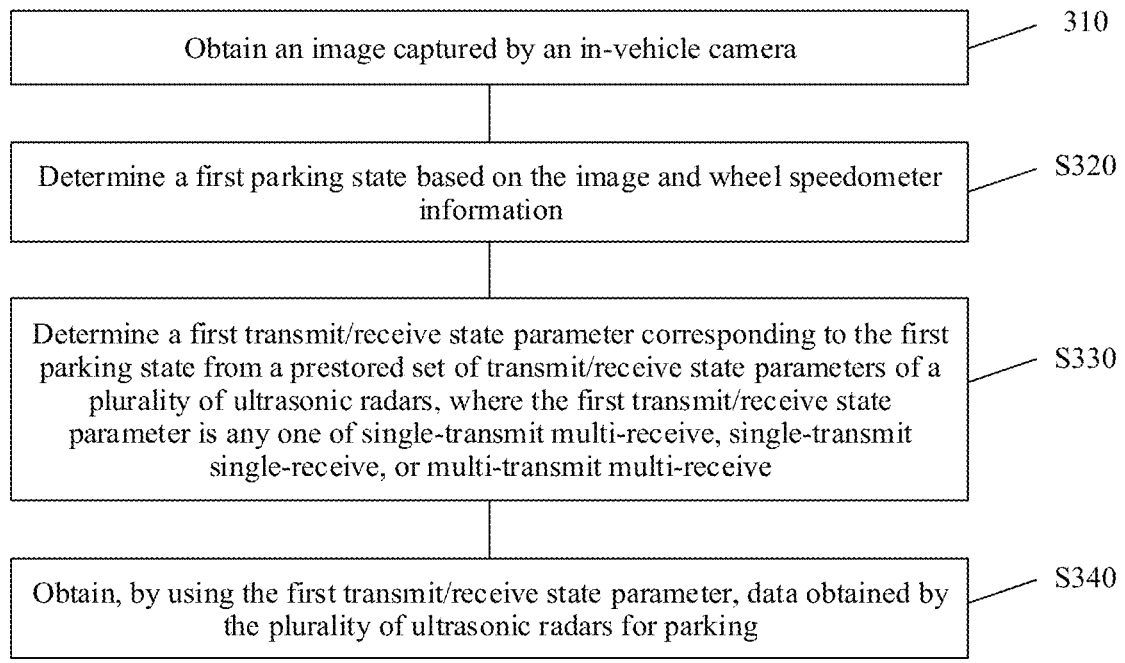
FIG. 13 is a schematic flowchart of yet another data processing method according to an embodiment of this application.

This application further provides a data processing method. The following describes in detail the data processing method provided in this application with reference to FIG. 13. FIG. 13 is a schematic flowchart of a data processing method 300 according to an embodiment of this application.

As shown in FIG. 13, the method 300 shown in FIG. 13 may include S310 to S340. The following describes the steps in the method 300 in detail with reference to FIG. 13.

S310: Obtain an image captured by an in-vehicle camera.

S320: Determine a first parking state based on the image and wheel speedometer information.

S330: Determine a first transmit/receive state parameter corresponding to the first parking state from a prestored set of transmit/receive state parameters of a plurality of ultrasonic radars, where the first transmit/receive state parameter is any one of single-transmit multi-receive, single-transmit single-receive, or multi-transmit multi-receive.

S340: Obtain, by using the first transmit/receive state parameter, data obtained by the plurality of ultrasonic radars for parking.

According to the data processing method provided in this application, the set of the transmit/receive state parameters of the plurality of ultrasonic radars are preconfigured or predefined based on different precision requirements during parking, and corresponding transmit/receive state parameters of the plurality of ultrasonic radars are determined based on different parking states. The data obtained by the plurality of ultrasonic radars is obtained by using the transmit/receive state parameters of the plurality of ultrasonic radars for parking, so that parking precision and a parking success rate can be improved.

It should be understood that a correspondence between the set of the transmit/receive state parameters of the plurality of ultrasonic radars, each of the transmit/receive state parameters of the plurality of ultrasonic radars, and the parking state may be preconfigured or predefined.

Optionally, in this embodiment of this application, when the first parking state is a parking space searching state or another parking state than a vehicle parking state, the transmit/receive state parameters of the plurality of ultrasonic radars are single-transmit single-receive; or when the first parking state is a vehicle parking state, the transmit/receive state parameters of the plurality of ultrasonic radars are single-transmit multi-receive or multi-transmit multi-receive.

For specific descriptions of S310 to S340, refer to the descriptions of S210, S240, and S270 in the method 200. For brevity, details are not described herein again.

Optionally, the method 300 may further include:
determining a to-be-detected target;
determining a feature region corresponding to the to-be-detected target in the image based on a location of the to-be-detected target in the image;
determining a first homography matrix corresponding to the first parking state from a prestored homography matrix set, where different parking states correspond to different homography matrices; and
processing image information of the feature region based on the first homography matrix, to obtain a detection result.

Optionally, in a possible implementation, when the first parking state is the parking space searching state, the first homography matrix is a far-end homography matrix, and the feature region corresponding to the to-be-detected target in the image is a first feature region; or when the first parking state is the vehicle parking state, the first homography matrix is a near-end homography matrix, and the feature region corresponding to the to-be-detected target in the image is a second feature region.

A distance from a to-be-detected target in the first feature region to a vehicle body is greater than a distance from a to-be-detected target in the second feature region to the vehicle body.

Optionally, in a possible implementation, the method 300 further includes:

adjusting a size of the feature region based on different parking environments.

Optionally, in a possible implementation, the parking environment includes at least one of a weather condition during parking, a ground condition during parking, or an ambient environment of a vehicle during parking.

It should be understood that, for specific descriptions of the foregoing possible implementations, refer to the descriptions in the related embodiment of the method 200. For brevity, details are not described herein again.

It should be further understood that the foregoing descriptions are merely intended to help a person skilled in the art better understand embodiments of this application, but are not intended to limit the scope of embodiments of this application. It is clear that a person skilled in the art may make various equivalent modifications or changes based on the foregoing examples. For example, some steps in the embodiments of the method 200 and the method 300 may be unnecessary, or some steps may be newly added, or any two or more of the foregoing embodiments are combined. Such a modified, changed, or combined solution also falls within the scope of embodiments of this application.

It should be further understood that the foregoing descriptions of embodiments of this application emphasize differences between embodiments, and same or similar parts that are not mentioned may be mutually referenced. For brevity, details are not described herein again.

It should be further understood that sequence numbers of the foregoing processes do not mean execution sequences. The execution sequences of the processes should be determined based on functions and internal logic of the processes, and should not be construed as any limitation on the implementation processes of embodiments of this application.

It should be further understood that, in embodiments of this application, "preset" and "predefined" may be implemented by prestoring corresponding code or a corresponding table in a device (including, for example, a terminal or a network device) or in another manner that can be used to indicate related information. A specific implementation is not limited in this application.

It should be further understood that division into the manners, cases, categories, and embodiments in embodiments of this application is merely for ease of description, and should not constitute a particular limitation. The features in the manners, categories, cases, and embodiments may be combined without contradiction.

It should be further understood that, in embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

The data processing methods in embodiments of this application are described above in detail with reference to FIG. 1 to FIG. 13. The following describes in detail data processing apparatuses in embodiments of this application with reference to FIG. 14 to FIG. 16.

Figure 14:
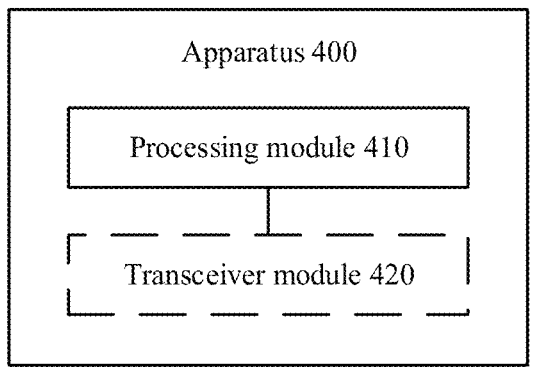
FIG. 14 is a schematic block diagram of a data processing apparatus according to an embodiment of this application.

FIG. 14 is a schematic block diagram of a data processing apparatus 400 according to an embodiment of this application. The apparatus 400 may correspond to the mobile device (for example, a vehicle) described in the method 200 or the method 300, or may be a chip, a component, an integrated circuit, a chip in an in-vehicle processor, or the like applied to the mobile device. In addition, modules or units in the apparatus 400 are separately configured to perform actions or processing processes performed in the method 200 or the method 300.

As shown in FIG. 14, the apparatus 400 includes a processing module (unit) 410. Optionally, the apparatus may further include a transceiver module (unit) 420. The transceiver module 420 is configured to perform specific signal receiving and sending under the drive of the processing module 410.

In a possible implementation, the processing module 410 is configured to:

obtain an image captured by an in-vehicle camera;

determine a to-be-detected target;

determine a feature region corresponding to the to-be-detected target in the image based on a location of the to-be-detected target in the image;

determine a first parking state based on the image and wheel speedometer information;

determine a first homography matrix corresponding to the first parking state from a prestored homography matrix set, where different parking states correspond to different homography matrices; and process image information of the feature region based on the first homography matrix, to obtain a detection result.

According to the data processing apparatus provided in this application, a plurality of homography matrices are preconfigured or predefined based on different precision requirements during parking, and different homography matrices correspond to different parking states. After a parking state is determined, image information of a feature region that corresponds to the parking state and that is of a to-be-detected target in an image is processed by using a specific homography matrix corresponding to the parking state, to obtain a detection result. Better parameter constraint may be performed on the feature region in which the to-be-detected target is located in the image, to improve detection precision and location precision of the feature region, thereby improving a parking success rate.

Optionally, in some embodiments of this application, the processing module 410 is further configured to:

determine a first transmit/receive state parameter corresponding to the first parking state from a prestored set of transmit/receive state parameters of a plurality of ultrasonic radars, where the first transmit/receive state parameter is any one of single-transmit multi-receive, single-transmit single-receive, or multi-transmit multi-receive.

Optionally, in some embodiments of this application, the first parking state is a parking space searching state or a vehicle parking state.

Optionally, in some embodiments of this application, when the first parking state is the parking space searching state, the first homography matrix is a far-end homography matrix, and the feature region corresponding to the to-be-detected target in the image is a first feature region; or when the first parking state is the vehicle parking state, the first homography matrix is a near-end homography matrix, and the feature region corresponding to the to-be-detected target in the image is a second feature region.

A distance from a to-be-detected target in the first feature region to a vehicle body is greater than a distance from a to-be-detected target in the second feature region to the vehicle body.

Optionally, in some embodiments of this application, when the first parking state is the parking space searching state, the first transmit/receive state parameter is single-transmit single-receive; or when the first parking state is the vehicle parking state, the first transmit/receive state parameter is single-transmit multi-receive or multi-transmit multi-receive.

Optionally, in some embodiments of this application, the processing module 410 is further configured to:

adjust a size of the feature region based on different parking environments.

Optionally, in some embodiments of this application, the parking environment includes at least one of a weather condition during parking, a ground condition during parking, or an ambient environment of a vehicle during parking.

In a possible implementation, the processing module 410 is configured to:

obtain an image captured by an in-vehicle camera;

determine a first parking state based on the image and wheel speedometer information;

determine a first transmit/receive state parameter corresponding to the first parking state from a prestored set of transmit/receive state parameters of a plurality of ultrasonic radars, where the first transmit/receive state parameter is any one of single-transmit multi-receive, single-transmit single-receive, or multi-transmit multi-receive; and obtain, by using the first transmit/receive state parameter, data obtained by the plurality of ultrasonic radars for parking.

According to the data processing apparatus provided in this application, the set of the transmit/receive state parameters of the plurality of ultrasonic radars are preconfigured or predefined based on different precision requirements during parking, and corresponding transmit/receive state parameters of the plurality of ultrasonic radars are determined based on different parking states. The data obtained by the plurality of ultrasonic radars is obtained by using the transmit/receive state parameters of the plurality of ultrasonic radars for parking, so that parking precision and a parking success rate can be improved.

Optionally, in some embodiments of this application, when the first parking state is a parking space searching state or another parking state than a vehicle parking state, the transmit/receive state parameters of the plurality of ultrasonic radars are single-transmit single-receive; or when the first parking state is a vehicle parking state, the transmit/receive state parameters of the plurality of ultrasonic radars are single-transmit multi-receive or multi-transmit multi-receive.

Optionally, in some embodiments of this application, the processing module 410 is further configured to:

determine a to-be-detected target;

determine a feature region corresponding to the to-be-detected target in the image based on a location of the to-be-detected target in the image;

determine a first homography matrix corresponding to the first parking state from a prestored homography matrix set, where different parking states correspond to different homography matrices; and process image information of the feature region based on the first homography matrix, to obtain a detection result.

Optionally, in a possible implementation, when the first parking state is the parking space searching state, the first homography matrix is a far-end homography matrix, and the feature region corresponding to the to-be-detected target in the image is a first feature region; or when the first parking state is the vehicle parking state, the first homography matrix is a near-end homography matrix, and the feature region corresponding to the to-be-detected target in the image is a second feature region.

A distance from a to-be-detected target in the first feature region to a vehicle body is greater than a distance from a to-be-detected target in the second feature region to the vehicle body.

Optionally, in a possible implementation, the processing module 410 is further configured to:

adjust a size of the feature region based on different parking environments.

Optionally, in a possible implementation, the parking environment includes at least one of a weather condition during parking, a ground condition during parking, or an ambient environment of a vehicle during parking.

It should be understood that, for a specific process of performing the foregoing corresponding steps by the modules (units) in the apparatus 400, refer to the foregoing descriptions with reference to the related embodiments of the method 200 and the method 300 and FIG. 6 to FIG. 13. For brevity, details are not described herein again.

Optionally, the transceiver module 420 may include a receiving module (unit) and a sending module (unit), configured to perform the steps of receiving information and sending information in the embodiments of the method 200 and the method 300.

Further, the apparatus 400 may further include a storage module (unit). The transceiver module 420 may be a transceiver, an input/output interface, or an interface circuit. The storage module is configured to store instructions executed by the transceiver module 420 and the processing module 410. The transceiver module 420, the processing module 410, and the storage module are coupled to each other. The storage module stores instructions. The processing module 410 is configured to execute the instructions stored in the storage module. The transceiver module 420 is configured to perform specific signal receiving and sending under the drive of the processing module 410.

It should be understood that the transceiver module 420 may be a transceiver, an input/output interface, or an interface circuit. The storage module may be a memory. The processing module 410 may be implemented by a processor. A data processing apparatus 500 shown in FIG. 15 may include a processor 510, a memory 520, and a transceiver 530.

Figure 15:
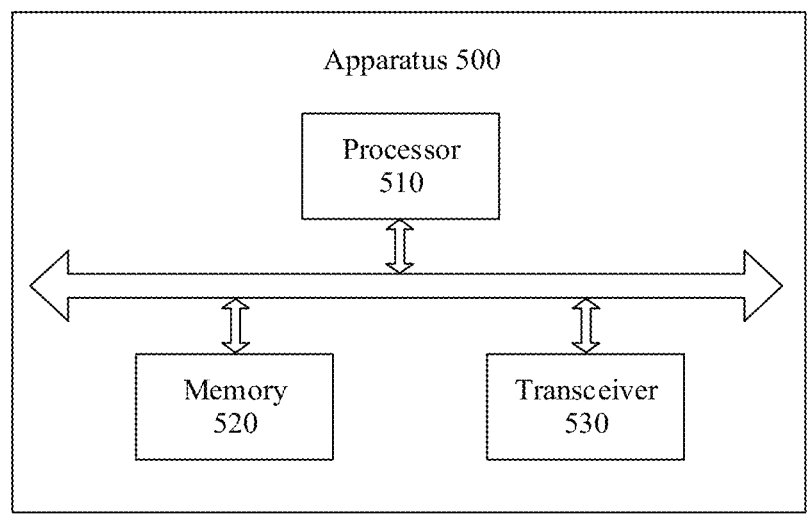
FIG. 15 is a schematic block diagram of another data processing apparatus according to an embodiment of this application.

The data processing apparatus 400 shown in FIG. 14 or the data processing apparatus 500 shown in FIG. 15 can implement the steps performed in the embodiments of the method 200, the method 300, and the embodiments shown in FIG. 6 to FIG. 13. For similar descriptions, refer to the descriptions in the foregoing corresponding methods. To avoid repetition, details are not described herein again.

It should be further understood that the data processing apparatus 400 shown in FIG. 14 or the data processing apparatus 500 shown in FIG. 15 may be a driver assistant apparatus or a driver assistant system integrated into a mobile device (for example, a vehicle), or may be a chip or an integrated circuit in the mobile device. For example, the chip may be a chip in an in-vehicle processor. The foregoing chip, integrated circuit, or the like is integrated into the data processing apparatus. This is not limited in this embodiment of this application.

Figure 16:
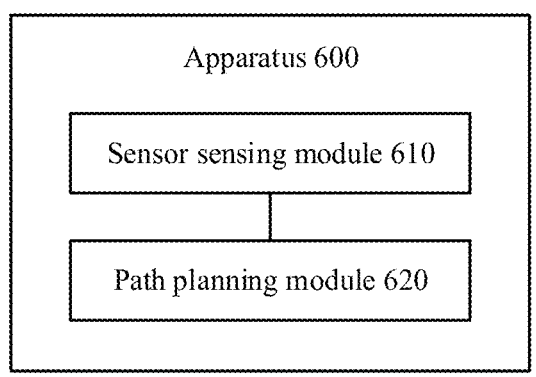
FIG. 16 is a schematic block diagram of still another data processing apparatus according to an embodiment of this application.

FIG. 16 is a schematic block diagram of still another data processing apparatus 600 according to an embodiment of this application. The data processing apparatus 600 may be a chip, a component, an integrated circuit, a chip in an in-vehicle processor, or the like applied to a mobile device (for example, a vehicle). In addition, modules or units in the data processing apparatus 600 are separately configured to perform actions or processing processes performed in the method 200 and the method 300.

As shown in FIG. 16, the data processing apparatus 600 includes a sensor sensing module 610 and a path planning module 620. Optionally, the sensor sensing module 610 and the path planning module 620 may be integrated into an in-vehicle chip, and there is a communication connection between the sensor sensing module 610 and the path planning module 620.

In a possible implementation,
the sensor sensing module 610 is configured to:
obtain an image captured by an in-vehicle camera;
determine a to-be-detected target;
determine a feature region corresponding to the to-be-detected target in the image based on a location of the to-be-detected target in the image; and
send the location of the to-be-detected target in the image and the image to the path planning module 620.

The path planning module 620 is configured to: determine a first parking state based on the image and wheel speedometer information; and
send the first parking state to the sensor sensing module 610.

The sensor sensing module 610 is further configured to: determine a first homography matrix corresponding to the first parking state from a prestored homography matrix set, where different parking states correspond to different homography matrices;
process image information of the feature region based on the first homography matrix, to obtain a detection result; and
send the detection result obtained after the image information is processed to the path planning module 620.

The path planning module 620 is further configured to plan a parking path based on the detection result obtained after the image information is processed.

According to the data processing apparatus provided in this application, a plurality of homography matrices are preconfigured or predefined based on different precision requirements during parking, and different homography matrices correspond to different parking states. After determining a parking state, the path planning module sends the parking state to the sensor sensing module. The sensor sensing module processes, by using a specific homography matrix corresponding to the parking state, image information of a feature region that corresponds to the parking state and that is of a to-be-detected target in an image, to obtain a detection result. The path planning module may plan a parking path based on the detection result. Therefore, better parameter constraint may be performed on the feature region in which the to-be-detected target is located in the image, to improve detection precision and location precision of the feature region, thereby improving a parking success rate.

Optionally, in some embodiments of this application, the sensor sensing module 610 is further configured to:

determine a first transmit/receive state parameter corresponding to the first parking state from a prestored set of transmit/receive state parameters of a plurality of ultrasonic radars, where the first transmit/receive state parameter is any one of single-transmit multi-receive, single-transmit single-receive, or multi-transmit multi-receive.

Optionally, in some embodiments of this application, the first parking state is a parking space searching state or a vehicle parking state.

Optionally, in some embodiments of this application, when the first parking state is the parking space searching state, the first homography matrix is a far-end homography matrix, and the feature region corresponding to the to-be-detected target in the image is a first feature region; or
when the first parking state is the vehicle parking state, the first homography matrix is a near-end homography matrix, and the feature region corresponding to the to-be-detected target in the image is a second feature region.

A distance from a to-be-detected target in the first feature region to a vehicle body is greater than a distance from a to-be-detected target in the second feature region to the vehicle body.

Optionally, in some embodiments of this application, when the first parking state is the parking space searching state, the first transmit/receive state parameter is single-transmit single-receive; or when the first parking state is the vehicle parking state, the first transmit/receive state parameter is single-transmit multi-receive or multi-transmit multi-receive.

Optionally, in some embodiments of this application, the sensor sensing module 610 is further configured to:
adjust a size of the feature region based on different parking environments.

Optionally, in some embodiments of this application, the parking environment includes at least one of a weather condition during parking, a ground condition during parking, or an ambient environment of a vehicle during parking.

In another possible implementation,
the sensor sensing module 610 is further configured to:
determine a to-be-detected target;
determine a feature region corresponding to the to-be-detected target in the image based on a location of the to-be-detected target in the image; and
send the location of the to-be-detected target in the image and the image to the path planning module 620.

The sensor sensing module 610 is further configured to: determine a first homography matrix corresponding to the first parking state from a prestored homography matrix set, where different parking states correspond to different homography matrices;
process image information of the feature region based on the first homography matrix, to obtain a detection result; and
send the detection result obtained after the image information is processed to the path planning module 620.

The path planning module 620 is further configured to plan a parking path based on the detection result obtained after the image information is processed.

It should be understood that, for a specific process of performing the foregoing corresponding steps by the modules (units) in the apparatus 600, refer to the foregoing descriptions with reference to the related embodiments of the method 200 and the method 300. For brevity, details are not described herein again.

It should be understood that the processor in embodiments of this application may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or may be any conventional processor or the like.

It should be further understood that the memory in embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. By way of example but not limitation, many forms of random access memories (random access memory, RAM) may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware, firmware, or any combination thereof. When the software is used to implement the foregoing embodiments, all or some of the foregoing embodiments may be implemented in a form of a computer program product. The computer program product includes one or more computer instructions or computer programs. When the computer instructions or the computer programs are loaded and executed on a computer, all or some of the procedures or functions in embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

An embodiment of this application further provides a computer-readable medium, configured to store computer program code. The computer program includes instructions used to perform the data processing methods in embodiments of this application in the method 200 or the method 300. The readable medium may be a read-only memory (read-only memory, ROM) or a random access memory (random access memory, RAM). This is not limited in this embodiment of this application.

This application further provides a computer program product. The computer program product includes instructions. When the instructions are executed, a data processing apparatus separately performs operations corresponding to the method 200 or the method 300.

An embodiment of this application further provides a system chip. The system chip includes a processing unit and a communications unit. The processing unit may be, for example, a processor, and the communications unit may be, for example, an input/output interface, a pin, or a circuit. The processing unit may execute computer instructions, to enable a chip in a communications apparatus to perform any data processing method provided in the foregoing embodiments of this application.

Optionally, any apparatus provided in the foregoing embodiments of this application may include the system chip.

Optionally, the computer instructions are stored in a storage unit.

Optionally, the storage unit is a storage unit inside the chip, for example, a register or a cache, or may be a storage unit outside the chip in the terminal, for example, a ROM, another type of static storage device capable of storing static information and instructions, or a RAM. The processor mentioned above may be a CPU, a microprocessor, an ASIC, or one or more integrated circuits for controlling program execution of the foregoing data processing methods. The processing unit and the storage unit may be decoupled, are separately disposed on different physical devices, and are connected in a wired or wireless manner to implement functions of the processing unit and the storage unit, to support the system chip in implementing various functions in the foregoing embodiments. Alternatively, the processing unit and the memory may be coupled on a same device.

It may be understood that the memory in embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. By way of example but not limitation, many forms of random access memories (random access memory, RAM) may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

In this application, names may be assigned to various objects such as messages/information/devices/network elements/systems/apparatuses/actions/operations/procedures/concepts. It may be understood that these specific names do not constitute a limitation on the related objects. The assigned names may vary with factors such as scenarios, contexts, or usage habits. Understanding of technical meanings of technical terms in this application should be determined mainly based on functions and technical effects embodied/performed by the technical terms in the technical solutions.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief descriptions, for a detailed working process of the foregoing system, apparatus, and unit, refer to a corresponding process in the foregoing method embodiments. Details are not described again herein.

In the several embodiments provided in this application, it should be understood that the disclosed system, apparatus, and method may be implemented in other manners. For example, the foregoing apparatus embodiments are merely examples. For example, division into the units is merely logical function division, and there may be another division manner during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The storage medium includes a USB flash drive, a removable hard disk, a read-only memory (read-only memory, ROM), a random access.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data processing method, the data processing method comprising:
   obtaining an image captured by an in-vehicle camera;
   determining a to-be-detected target in the image;
   determining a feature region corresponding to the to-be-detected target in the image based on a location of the to-be-detected target in the image;
   determining a first parking state based on the image and wheel speedometer information;
   determining a first homography matrix corresponding to the first parking state from a prestored homography matrix set, wherein different parking states correspond to different homography matrices in the prestored homography matrix set; and
   processing image information of the feature region based on the first homography matrix to obtain a detection result.

2. The data processing method according to claim 1, wherein the data processing method further comprises:
   determining a first transmit/receive state parameter corresponding to the first parking state from a prestored set of transmit/receive state parameters of a plurality of ultrasonic radars, wherein the first transmit/receive state parameter is any one of single-transmit multi-receive, single-transmit single-receive, or multi-transmit multi-receive.

3. The data processing method according to claim 1, wherein
   the first parking state is a parking space searching state or a vehicle parking state.

4. The data processing method according to claim 3, wherein;
   when the first parking state is the parking space searching state, the first homography matrix is a far-end homography matrix, and the feature region corresponding to the to-be-detected target in the image is a first feature region; or
   when the first parking state is the vehicle parking state, the first homography matrix is a near-end homography matrix, and the feature region corresponding to the to-be-detected target in the image is a second feature region, wherein
   a distance from a to-be-detected target in the first feature region to a vehicle body is greater than a distance from a to-be-detected target in the second feature region to the vehicle body.

5. The data processing method according to claim 4, wherein:
   when the first parking state is the parking space searching state, the first transmit/receive state parameter is single-transmit single-receive; or
   when the first parking state is the vehicle parking state, the first transmit/receive state parameter is single-transmit multi-receive or multi-transmit multi-receive.

6. The data processing method according to claim 1, wherein the data processing method further comprises:
   adjusting a size of the feature region based on different parking environments.

7. The data processing method according to claim 6, wherein each parking environment comprises at least one of a weather condition during parking, a ground condition during parking, or an ambient environment of a vehicle during parking.

8. The data processing method according to claim 1, wherein the to-be-detected target comprises at least one of a parking space or an obstacle.

9. A data processing method, the data processing method comprising:
generating an image;
obtaining detection information based on the image;
sending the detection information;
receiving a first parking state information of a first parking state;
determining a first homography matrix corresponding to the first parking state from a prestored homography matrix set, wherein different parking states correspond to different homography matrices in the prestored homography matrix set; and
processing image information of the image based on the first homography matrix to obtain a detection result.

10. The data processing method according to claim 9, wherein
the first parking state is a parking space searching state or a vehicle parking state.

11. The data processing method according to claim 10, the data processing method further comprising:
determining a to-be-detected target according to the image;
determining a feature region corresponding to the to-be-detected target in the image based on a location of the to-be-detected target in the image.

12. The data processing method according to claim 11, wherein:
when the first parking state is the parking space searching state, the first homography matrix is a far-end homography matrix, and the feature region corresponding to the to-be-detected target in the image is a first feature region; or
when the first parking state is the vehicle parking state, the first homography matrix is a near-end homography matrix, and the feature region corresponding to the to-be-detected target in the image is a second feature region, wherein
a distance from a particular to-be-detected target in the first feature region to a vehicle body is greater than a distance from a particular to-be-detected target in the second feature region to the vehicle body.

13. The data processing method according to claim 11, adjusting a size of the feature region based on different parking environments.

14. The data processing method according to claim 11, wherein the data processing method further comprises:
adjusting a size of the feature region based on different parking environments.

15. An apparatus, the apparatus comprising:
at least one processor; and
one or more memories coupled to the at least one processor and storing program instructions for execution by the at least one processor to:
obtain an image captured by an in-vehicle camera;
determine a to-be-detected target in the image;
determine a feature region corresponding to the to-be-detected target in the image based on a location of the to-be-detected target in the image;
determine a first parking state based on the image and wheel speedometer information;
determine a first homography matrix corresponding to the first parking state from a prestored homography matrix set, wherein different parking states correspond to different homography matrices in the prestored homography matrix set; and
process image information of the feature region based on the first homography matrix, to obtain a detection result.

16. The apparatus according to claim 15, wherein the one or more memories stores the program instructions for execution by the at least one processor to:
determine a first transmit/receive state parameter corresponding to the first parking state from a prestored set of transmit/receive state parameters of a plurality of ultrasonic radars, wherein the first transmit/receive state parameter is any one of single-transmit multi-receive, single-transmit single-receive, or multi-transmit multi-receive.

17. The apparatus according to claim 15, wherein
the first parking state is a parking space searching state or a vehicle parking state.

18. The apparatus according to claim 17, wherein:
when the first parking state is the parking space searching state, the first homography matrix is a far-end homography matrix, and the feature region corresponding to the to-be-detected target in the image is a first feature region; or
when the first parking state is the vehicle parking state, the first homography matrix is a near-end homography matrix, and the feature region corresponding to the to-be-detected target in the image is a second feature region, wherein
a distance from a to-be-detected target in the first feature region to a vehicle body is greater than a distance from a to-be-detected target in the second feature region to the vehicle body.

19. The apparatus according to claim 18, wherein
when the first parking state is the parking space searching state, the first transmit/receive state parameter is single-transmit single-receive; or
when the first parking state is the vehicle parking state, the first transmit/receive state parameter is single-transmit multi-receive or multi-transmit multi-receive.

20. The apparatus according to claim 15, wherein the one or more memories stores the program instructions for execution by the at least one processor to:
adjust a size of the feature region based on different parking environments.

21. The apparatus according to claim 20, wherein
each parking environment comprises at least one of a weather condition during parking, a ground condition during parking, or an ambient environment of a vehicle during parking.

* * * * *